United States Patent
Liao et al.

(10) Patent No.: US 10,977,663 B1
(45) Date of Patent: Apr. 13, 2021

(54) METHOD AND SYSTEM FOR RECOMMENDING ASSISTANCE OFFERINGS USING MULTIVARIATE RANDOM FOREST LEVERAGING NEGATIVE SAMPLES

(71) Applicant: Intuit Inc., Mountain View, CA (US)

(72) Inventors: Linxia Liao, Fremont, CA (US); Ngoc Nhung Ho, Sunnyvale, CA (US); Bei Huang, Menlo Park, CA (US); Meng Chen, San Jose, CA (US)

(73) Assignee: Intuit Inc., Mountain View, CA (US)

( * ) Notice: Subject to any disclaimer, the term of this patent is extended or adjusted under 35 U.S.C. 154(b) by 446 days.

(21) Appl. No.: 15/905,630

(22) Filed: Feb. 26, 2018

(51) Int. Cl.
*G06N 20/00* (2019.01)
*G06Q 30/00* (2012.01)
*G06Q 40/00* (2012.01)

(52) U.S. Cl.
CPC ........... *G06Q 30/016* (2013.01); *G06N 20/00* (2019.01); *G06Q 40/123* (2013.12)

(58) Field of Classification Search
CPC ...................................................... G06N 20/00

USPC .......................................................... 705/14
See application file for complete search history.

(56) References Cited

U.S. PATENT DOCUMENTS

2016/0225017 A1* 8/2016 Wong ................. G06Q 30/0247

OTHER PUBLICATIONS

Anonymous, "116th Annual Meeing of American Association of Colleges of Pharmacy . . . "; Alexandria, vol. 79, Iss. 5. (Year: 2015).*

* cited by examiner

*Primary Examiner* — Edward Chang
(74) *Attorney, Agent, or Firm* — Paradice and Li LLP

(57) ABSTRACT

A method and system identify assistance offerings that are likely to be relevant to users of a data management system. The method and system utilize a multivariate random forest regression machine learning process to train an assistance offerings recommendation model to recommend relevant assistance offerings to users of the data management system. The multivariate random forest regression machine learning process replaces zero values in the training set data with negative numbers to increase the accuracy of the machine learning process.

44 Claims, 5 Drawing Sheets

METHOD AND SYSTEM FOR RECOMMENDING ASSISTANCE OFFERINGS USING MULTIVARIATE RANDOM FOREST LEVERAGING NEGATIVE SAMPLES

BACKGROUND

Many people utilize data management systems to assist in the management of various kinds of data. For example, people utilize data management systems to assist in managing aspects of their finances. Accordingly, data management systems assist users in bookkeeping, tax return preparation, financial transaction monitoring, budgeting assistance, and many other kinds of data management.

However, many users are not fully aware of all of the ways that data management systems can assist users to manage their data. Users may use one service or product provided by a data management system but are wholly unaware of other products and services offered by the data management system that would be very beneficial to the users. Users that remain unaware of the full extent of available products and services offered by data management systems may suffer adverse consequences when they do not manage their data in an optimal manner. In the case of financial management systems, users may suffer adverse financial consequences because they are not aware that many other helpful products and services of the data management system are available to them.

Some traditional data management systems provide users with assistance offerings in the form of advertisements or notifications while the users utilize the services of the traditional data management systems in order to make users aware of valuable products and services. However, these traditional data management systems often provide the same assistance offerings to each user without regard to the personal preferences or needs of the users. In other cases, traditional data management systems cycle through assistance offerings or present them to users at random. While this is an improvement over traditional data management systems that provide no assistance offerings at all, the static and inflexible assistance offerings that are the same for all users still represent a gross underutilization of the opportunity to inform millions of users of valuable products and services provided by the data management systems.

One reason that traditional data management systems provide the same static assistance offerings for all users is because traditional data management systems are not able to overcome the technical difficulties in identifying and selecting assistance offerings targeted to be relevant to individual users in real time based on the preferences of the user without simultaneously expending tremendous amounts of processing, memory, and communication bandwidth resources. Currently, when users access services of traditional data management systems, the traditional data management systems are unable to efficiently provide personalized assistance offerings in real time. The result is that users may become frustrated at repeatedly seeing the same irrelevant assistance offerings. Users may also become frustrated at a perceived lack of relevant services offered by the data management systems and may abandon the data management systems.

Accordingly, there exists a technical problem of efficiently and effectively providing real time personalized assistance offerings to users of data management systems. What is needed is a system and method that can provide a technical solution to the technical problem of inefficient and inadequate assistance offering messaging.

SUMMARY

Embodiments of the present disclosure provide one or more technical solutions to the technical problem of efficiently and accurately identifying relevant assistance offerings for users of data management systems.

Embodiments of the present disclosure utilize historical user data related to historical users of a data management system and supervised machine learning methods to train an assistance offering recommendation model to accurately identify assistance offerings that are likely to be relevant to a current user of the data management system. The assistance offering recommendation model is trained with a multivariate random forest regression machine learning process to identify relevant assistance offerings for a current user based on the historical user data indicating how historical users that are similar to the current user have clicked on or selected assistance offerings that were presented to them. When a historical user has not previously selected an assistance offering, the historical user data may reflect a selection rate of zero for that assistance offering and historical user. However, these zero values can be misleading because historical users that were exposed to an assistance offering very few times will have the same selection rate as historical users that were exposed to the assistance offering many times. Accordingly, embodiments of the present disclosure augment the training process by replacing these zero values with negative numbers generated with a mathematical function based on the number of times the historical user was exposed to the assistance offering. This greatly enhances the accuracy of the model in identifying assistance offerings that are likely to be relevant to a current user.

Embodiments of the present disclosure address some of the shortcomings associated with traditional data management systems by providing a data management system that utilizes supervised machine learning processes in order to provide relevant assistance offerings to users. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing relevant personalized assistance offerings, electronic data management is significantly improved.

Figure 1:
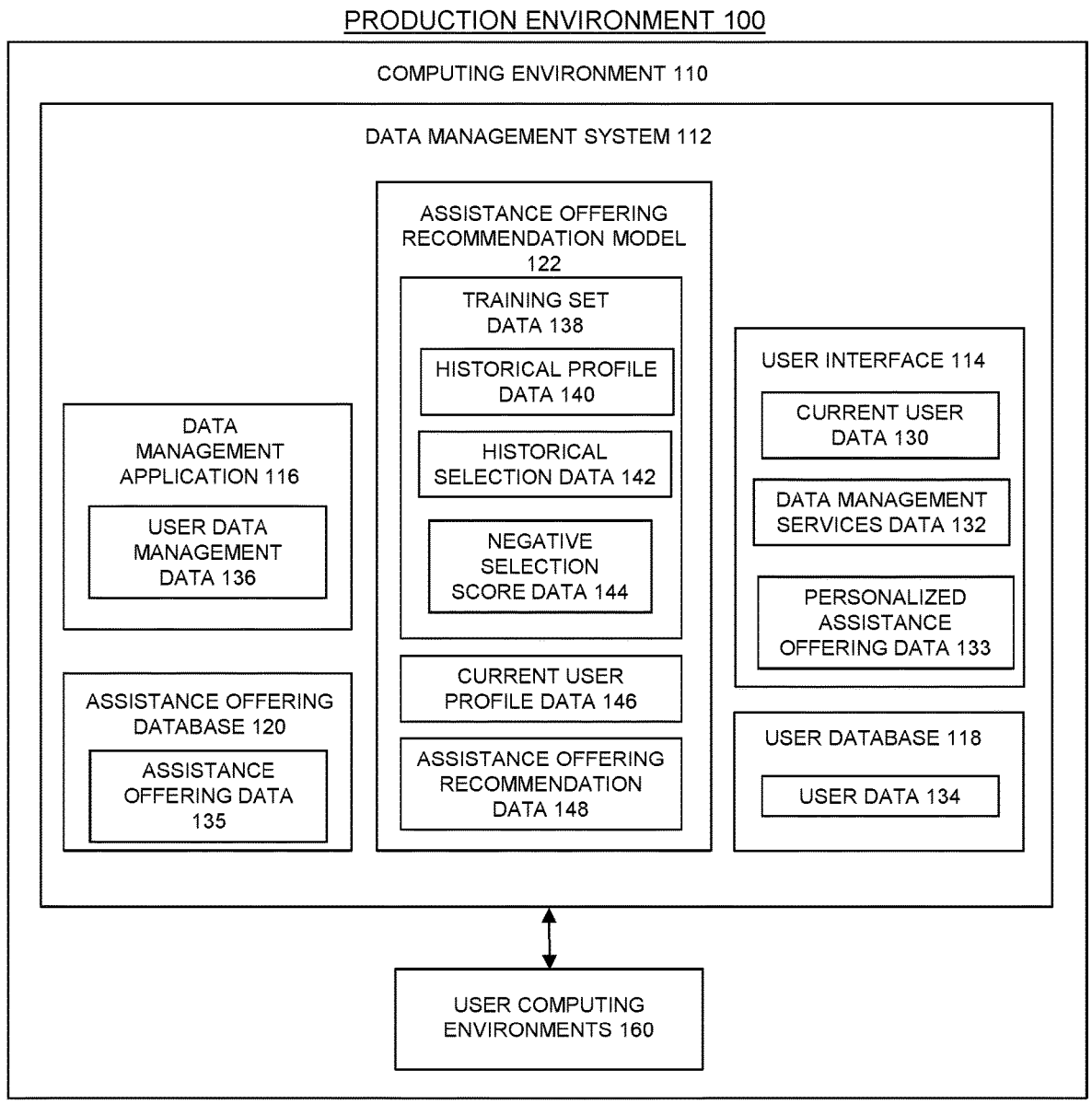
FIG. 1 is a block diagram of software architecture for identifying relevant assistance offerings for users of a data management system based on a machine learning process, in accordance with one embodiment.

Common reference numerals are used throughout the FIG.s and the detailed description to indicate like elements. One skilled in the art will readily recognize that the above FIG.s are examples and that other architectures, modes of operation, orders of operation, and elements/functions can be provided and implemented without departing from the characteristics and features of the invention, as set forth in the claims.

Term Definitions

Various embodiments of systems and methods described herein include one or more computers, which may also be referred to herein as computing systems or processors. As used herein the term computer includes any programmable machine or machines capable of performing arithmetic and/or logical operations. In various embodiments, computers include one or more of processors, memories, data storage devices, and/or other components as discussed herein, and/or as known in the art at the time of filing, and/or as developed after the time of filing. In various embodiments, these components are connected physically or through network or wireless links. In various embodiments, computers include software which directs the operations of the aforementioned components. In various embodiments, the software can thereby transform the aforementioned computers and components into special purpose computers and components.

Herein, computers may also be referred to with terms that are commonly used by those of ordinary skill in the relevant arts, such as servers, PCs, mobile devices, routers, switches, data centers, distributed computers, and other terms. In various embodiments, computers facilitate communications between users and/or other computers, provide databases, perform analysis and/or transformation of data, and/or perform other functions. It will be understood by those of ordinary skill that those terms used herein are interchangeable, and any computer capable of performing the described functions may be used.

In various embodiments, computers may be linked to one another via a network or networks. In various embodiments, a network is any plurality of completely or partially interconnected computers wherein some or all of the computers are able to communicate with one another. It will be understood by those of ordinary skill that connections between computers may be wired in some cases (e.g., via Ethernet, coaxial, optical, or other wired connection) or may be wireless (e.g., via Wi-Fi, WiMax, or other wireless connections). In various embodiments, connections between computers may use any protocols, including connection-oriented protocols such as TCP or connectionless protocols such as UDP. Any connection through which at least two computers may exchange data can be the basis of a network.

Herein, the term "production environment" includes the various computers and components, i.e., assets, used to deploy, implement, access, and use, a given application as that application is intended to be used. In various embodiments, production environments include multiple assets that are combined, communicatively coupled, virtually and/or physically connected, and/or associated with one another, to provide the production environment implementing the application.

As used herein, the term "computing environment" includes, but is not limited to, a logical or physical grouping of connected or networked computers using the same infrastructure and systems such as, but not limited to, hardware systems, software systems, and networking/communications systems. Typically, computing environments are either known environments, e.g., "trusted" environments, or unknown, e.g., "untrusted" environments. Typically, trusted computing environments are those where the assets, infrastructure, communication and networking systems, and security systems associated with the computers, components, and/or virtual assets making up the trusted computing environment, are either under the control of, or known to, a party.

In various embodiments, each computing environment includes allocated assets, such as computers and components, and virtual assets associated with, and controlled or used to create, and/or deploy, and/or operate an application.

In various embodiments, one or more cloud computing environments are used to create, and/or deploy, and/or operate an application that can be any form of cloud computing environment, such as, but not limited to, a public cloud; a private cloud; a virtual private network (VPN); a subnet; a Virtual Private Cloud (VPC); a sub-net or any security/communications grouping; or any other cloud-based infrastructure, sub-structure, or architecture, as discussed herein, and/or as known in the art at the time of filing, and/or as developed after the time of filing.

In many cases, a given application or service may utilize, and interface with, multiple cloud computing environments, such as multiple VPCs, in the course of being created, and/or deployed, and/or operated.

As used herein, the term "virtual asset" includes any virtualized entity or resource, and/or virtualized part of an actual, or "bare metal" entity. In various embodiments, the virtual assets can be, but are not limited to, virtual machines, virtual servers, and instances implemented in a cloud computing environment; databases associated with a cloud computing environment, and/or implemented in a cloud computing environment; services associated with, and/or delivered through, a cloud computing environment; communications systems used with, part of, or provided through, a cloud computing environment; and/or any other virtualized assets and/or sub-systems of "bare metal" physical devices such as mobile devices, remote sensors, laptops, desktops, point-of-sale devices, etc., located within a data center, within a cloud computing environment, and/or any other physical or logical location, as discussed herein, and/or as known/available in the art at the time of filing, and/or as developed/made available after the time of filing.

In various embodiments, any, or all, of the components making up a given production environment discussed herein, and/or as known in the art at the time of filing, and/or as developed after the time of filing, can be implemented as one or more virtual assets.

As used herein, the term "user" includes, but is not limited to, any party, parties, entity, and/or entities using, or otherwise interacting with any of the methods or systems discussed herein. For instance, in various embodiments, a user can be, but is not limited to, a person, a commercial entity, an application, a service, and/or a computing system.

As used herein, the term "relationship(s)" includes, but is not limited to, a logical, mathematical, statistical, or other association between one set or group of information, data, and/or users and another set or group of information, data, and/or users, according to one embodiment. The logical, mathematical, statistical, or other association (i.e., relationship) between the sets or groups can have various ratios or correlation, such as, but not limited to, one-to-one, multiple-to-one, one-to-multiple, multiple-to-multiple, and the like, according to one embodiment. As a non-limiting example, if the disclosed system and method for providing access control and enhanced encryption determines a relationship between a first group of data and a second group of data, then a characteristic or subset of a first group of data can be related to, associated with, and/or correspond to one or more characteristics or subsets of the second group of data, or vice-versa, according to one embodiment. Therefore, relationships may represent one or more subsets of the second group of data that are associated with one or more subsets of the first group of data, according to one embodiment. In one embodiment, the relationship between two sets or groups of data includes, but is not limited to similarities, differences, and correlations between the sets or groups of data.

As used herein, the term storage container includes, but is not limited to, any physical or virtual data source or storage device. For instance, in various embodiments, a storage container can be, but is not limited to, one or more of a hard disk drive, a solid-state drive, an EEPROM, an optical disk, a server, a memory array, a database, a virtual database, a virtual memory, a virtual data directory, or other physical or virtual data sources.

As used herein, the term application container includes, but is not limited to, one or more profiles or other data sets that allow users and processes to access only particular data within a file system related to a storage container. For instance, in various embodiments, an application container can include, but is not limited to, a set of rules, a list of files, a list of processes, and/or encryption keys that provide access control to a file system such that a user associated with the application container can only access data, files, objects or other portions of a file system in accordance with the set of rules, the list of files, the list of processes, and/or encryptions keys.

As used herein, the term file includes, but is not limited to, a data entity that is a sequence of bytes that can be accessed individually or collectively.

As used herein the term data object includes, but is not limited to, a data entity that is stored and retrieved as a whole, or in large chunks, rather than as a sequence of bytes.

DETAILED DESCRIPTION

Embodiments will now be discussed with reference to the accompanying FIG.s, which depict one or more exemplary embodiments. Embodiments may be implemented in many different forms and should not be construed as limited to the embodiments set forth herein, shown in the FIG.s, and/or described below. Rather, these exemplary embodiments are provided to allow a complete disclosure that conveys the principles of the invention, as set forth in the claims, to those of skill in the art.

It should be noted that, to the extent, and whenever, any tax data associated with a business, person, or any other entity is used with the disclosed embodiments, that tax data is utilized for testing of tax preparation systems, or for other test case purposes, only.

In addition, to the extent, and whenever, user data, such as, but not limited to, any personal identification data associated with a business, person, or any other entity is used with the disclosed embodiments, that data is sanitized to eliminate any passwords, identifying numbers, account numbers, or any other data that could identify a business, person, or entity either directly or by process of elimination.

Embodiments of the present disclosure utilize historical user data related to previous and current users of a data management system as training data for an assistance offering recommendation model to accurately identify assistance offerings that are likely to be relevant to a current user of the data management system.

In one embodiment, the machine learning process augments the training process by replacing zero selection rate values in the historical user data with negative numbers generated with a mathematical function based on the number of times the historical users were exposed to the assistance offerings.

Using the disclosed embodiments of a method and system for identifying relevant assistance offerings for users of a data management system based on a machine learning process, a method and system for identifying relevant assistance offerings for users of a data management system based on a machine learning process is provided that is more efficient and accurate than currently available systems. Therefore, the disclosed embodiments provide a technical solution to the long standing technical problem of efficiently and accurately providing assistance offerings to users of a data management system.

The disclosed embodiments of a method and system for identifying relevant assistance offerings for users of a data management system based on a machine learning process are also capable of dynamically adapting to constantly changing business environments and data management fields such as financial transaction management, accounting, bookkeeping, and tax return preparation. Consequently, the disclosed embodiments of a method and system for identifying relevant assistance offerings for users of a data management system based on a machine learning process also provide a technical solution to the long standing technical problem of static and inflexible data management systems.

The result is a much more accurate, adaptable, and robust method and system for identifying relevant assistance offerings for users of a data management system based on a machine learning process than traditional and currently available systems. However, the disclosed method and system for identifying relevant assistance offerings for users of a data management system based on a machine learning process does not encompass, embody, or preclude other forms of innovation in the area of electronic data management.

In addition, the disclosed embodiments do not represent an abstract idea for at least a few reasons. First, using historical user data related to previous and current users of a bookkeeping system as training data for supervised machine learning based models is not an abstract idea because it is not merely an idea itself (e.g., cannot be performed mentally or using pen and paper).

In fact, the disclosed embodiments require the preparation and use of special training data obtained from two or more, and, in various embodiments, millions, tens of millions, or hundreds of millions or more, of historical and current users of a data management system to detect a variety of interconnections and relationships. This fact alone makes it virtually impossible to perform the disclosed embodiments mentally or with pen and paper alone. In addition, some of the disclosed embodiments include creating, and, in some embodiments, labeling, special model training data sets, developing, applying, and dynamically modifying one or more analytics models using supervised and unsupervised training processes, and the application of artificial intelligence; none of which can be performed mentally or with pen and paper alone.

Second, the disclosed embodiments are not an abstract idea because they do not represent or encompass any fundamental economic practice, fundamental data processing practice, or method of organizing human activity. In fact, the disclosed embodiments are directed to providing solutions to relatively new problems associated with data management systems such as electronic financial management systems and big data analysis.

Fourth, although, in one embodiment, mathematics, and/or unsupervised machine learning, and/or supervised machine learning, and/or semi-supervised machine learning, may be used to generate one or more analytics models, and/or algorithms, the disclosed embodiments are not simply a mathematical relationship/formula.

Further, the disclosed methods and systems represent an ordered combination of elements and operations that, when implemented as disclosed herein, significantly improve the fields of data processing and management and results in less human and processor resources being dedicated to identifying and providing relevant assistance offerings. Thus, embodiments of the present disclosure lead to the usage of fewer processing resources, usage of fewer memory storage assets, and less communication bandwidth being utilized to transmit data for analysis or correction.

As a specific illustrative example, the disclosed method and system for identifying relevant assistance offerings for users of a data management system based on a machine learning process provides for the processing and storage of smaller amounts of data related to identifying relevant assistance offerings. Because relevant assistance offerings are identified more efficiently, fewer system resources are devoted to generating assistance offering recommendations. Consequently, using the disclosed method and system for identifying relevant assistance offerings for users of a data management system based on a machine learning process results in more efficient use of human and non-human resources, fewer processor cycles being utilized, reduced memory utilization, and less communications bandwidth being utilized to relay data to, and from, backend systems and client systems, and various systems and parties. As a result, computing systems are transformed into faster, more efficient, and more effective computing systems by implementing the method and system for identifying relevant assistance offerings for users of a data management system based on a machine learning process.

FIG. 1 illustrates a block diagram of a production environment 100 for identifying relevant assistance offerings for users of a data management system based on a machine learning process, according to one embodiment. Embodiments of the present disclosure provide methods and systems for identifying relevant assistance offerings for users of a data management system based on a machine learning process. In particular, embodiments of the present disclosure utilize a supervised machine learning process to train a model to identify relevant assistance offerings to users of the data management system. When a user of the data management system accesses services of the data management system, the data management system identifies assistance offerings that are likely to be relevant to the user and provides the assistance offerings to the user while the user accesses services of the data management system.

In one embodiment, the machine learning process augments the training process by replacing zero selection rate values in the historical user data with negative numbers generated with a mathematical function based on the number of times the historical users were exposed to the assistance offerings.

Embodiments of the present disclosure identify and provide relevant assistance offerings to users based on the machine learning process.

In one embodiment, the production environment 100 includes a computing environment 110. The computing environment 110 represents one or more computers and components such as a server, and/or distribution center that is configured to receive, execute, and host one or more data storage and access systems, according to one embodiment. The computing environment 110 represents a traditional data center computing environment, a virtual asset computing environment (e.g., a cloud computing environment), or a hybrid between a traditional data center computing environment and a virtual asset computing environment, according to various embodiments.

In one embodiment, the computing environment 110 includes a data management system 112. The data management system 112 includes a user interface 114, a data management application 116, a user database 118, an assistance offering database 120, and an assistance offering recommendation model 122, according to various embodiments.

In one embodiment, the data management system 112 is a financial management system. The financial management system can include one or more of a bookkeeping system, a tax return preparation system, a personal financial monitoring system, and a budgeting system, according to various embodiments. The financial management system assists users to manage their finances.

In one embodiment, the data management system 112 utilizes the user interface 114 to enable the users of the data management system 112 to interact with the data management system 112. The user interface 114 enables users to access the data management services of the data management system 112. The user interface 114 enables users to provide data and instructions to the data management system 112. The user interface 114 enables the data management system 112 to provide data to the user in conjunction with the data management services provided by the data management system 112.

In one embodiment, the user interface 114 enables the data management system 112 to interface with user computing environments 160. The user computing environments 160 include computing environments utilized by users of the data management system 112. The user computing environments can include one or more of desktop computing devices, mobile phone computing devices, tablet computing devices, laptop computing devices, and cloud-based computing devices. The user computing environments 160 can include computing environments utilized by users of the data management system 112 to access the data management services of the data management system 112. The user computing environments 160 access the data management system 112 via the user interface 114 in order to provide data to the data management system 112 and to receive data from the data management system 112.

In one embodiment, one or more components of the data management system 112, or portions of one or more components of the data management system 112, are implemented in the user computing environments 160. Thus, while not explicitly illustrated in FIG. 1, in one embodiment, some of the processing, software, and memory resources associated with functionality of the data management system 112 are implemented in the user computing environments 160.

In one embodiment, the user interface 114 receives current user data 130 from a current user of the data management system 112. The current user data 130 can include any data provided by the user to the data management system 112 in order to interface with and receive data management services from the data management system 112. The current user data 130 can include data related to financial or demographic characteristics of the current user, personal information related to the current user, instructions provided by the current user to the data management system 112, selections made by the current user while navigating the services provided by the data management system 112, and data collected by the data management system 112 related to characteristics of the user computing environment 160 by which the user has accessed the data management system 112.

In one embodiment, the user interface 114 includes resources of the data management system 112 that provide webpage data to users via web browsers utilized by the users. Additionally, or alternatively, in one embodiment the user interface 114 includes resources of the data management system 112 that provide data management services to users via a dedicated software application accessed by the users.

In one embodiment, the data management system 112 provides data management services data 132 to the users via the user interface 114.

In one embodiment, when current users of the data management system 112 access services of the data management system 112, the user interface 114 provides data management services data 132 to the users. The data management services data 132 includes data management interview content, data management services, personal data of users, or other data provided by the data management system 112 to users of the data management system 112.

In one embodiment, the user interface 114 presents personalized assistance offering data 133 to the user while the user accesses the data management services of the data management system 112. The personalized assistance offering data 133 is presented to users simultaneously with the data management services data 132, for example, on the same webpage or in the same screen presented with a software application associated with the data management system 112.

In one embodiment, the personalized assistance offering data includes one or more assistance offerings selected based, in part, on the characteristics of the current user. The assistance offerings can include advertisements for other products or services provided by the data management system 112. The assistance offerings can also include links to question-and-answer databases associated with the data management system 112. The assistance offerings can also include links to other resources that can assist the users to satisfactorily utilize the services of the data management system 112.

In one embodiment, the user interface 114 presents multiple assistance offerings to the current user simultaneously. The user interface 114 can present multiple assistance offerings including one or more advertisements for paid products and services of the data management system 112 or links to helpful resources for the current user to access.

In one embodiment, the data management system 112 includes a data management application 116. The data management application 116 can include a software application implemented by the data management system 112 to provide data management services to the user. The data management application 116 can include an application of the data management system 112 that is accessed by the current user via a web browser. The data management application 116 can include a software application executed by computing resources of the user computing environments 160. Accordingly, the data management application can be partially or entirely implemented by the user computing environments 160. One or more of the other illustrated components of the data management system 112 can be part of the data management application 116. For example, the user interface 114 can be part of, or implemented in conjunction with, the data management application 116.

In one embodiment, the data management application 116 can include user data management data 136. The user data management data 136 can include data that has been processed or restructured in accordance with data management services requested by the user. In an example in which the data management system 112 is a financial management system, the data management application 116 can include a bookkeeping system. In this case, the user data management data 136 can include data associated with a business of the user that has been structured or processed by the bookkeeping system so that the user can quickly view and access bookkeeping data associated with the user's business.

In one embodiment, the data management system 112 maintains a user database 118. The user database 118 includes user data 134. The user data 134 stores data related to current and historical users of the data management system 112. The user data 134 can include all data collected relating to users of the data management system 112. The user data 134 can include data provided expressly by the users of the data management system 112 to the data management system 112, or data collected by the data management system 112 related to the users of the data management system 112.

In one embodiment, the user data 134 includes profile data for both historical and current users of the data management system 112. The profile data can include demographics data related to the users, financial data related to the users, personal information related to the users, and other information related to characteristics of the users. In an example in which the data management system 112 is a bookkeeping system, the profile data can include a length of time that the user has been associated with the data management system, a number of employees in a business associated with the user, a length of time that a business associated with the user has existed, payroll data associated with the user, demographic data associated with the user, and financial data associated with the user. In one embodiment, the profile data can include clickstream data indicating how the user has navigated through data management services provided by the data management system. In one embodiment, the profile data can include click stream data indicating how the user has navigated through the various services provided by the data management system 112 in the past.

In one embodiment, the user data 134 includes selection data or click through data. The selection data indicates how many times users of the data management systems have been exposed to an assistance offering, and how many times the users have selected the assistance offerings. In one embodiment, the selection data includes a selection score for each user and for each assistance offering. The selection score can include a selection rate defined as a ratio of the number of times that the user selected the assistance offering versus the number of times that the user was exposed to the assistance offering. As will be set forth in more detail below, the data management system 112 utilizes the selection data in order to assist in determining which assistance offering should be provided to a current user of the data management system 112.

In one embodiment, the assistance offering database 120 is a database of all of the assistance offerings that the data management system 112 can select from in providing assistance offerings to the users of the data management system 112. The assistance offering database 120 includes assistance offering data 135 corresponding to the assistance offerings. Thus, the assistance offering database 120 stores assistance offering data 135 including a plurality of assistance offerings that can be offered to users of the data management system 112.

In one embodiment, the data management system 112 utilizes the assistance offering recommendation model 122 to recommend assistance offerings that are likely to be relevant to a current user of the data management system 112. The assistance offering recommendation model 122 is trained with a machine learning process to identify assistance offerings from the assistance offering database 120 that are likely to be relevant to a current user of the data management system 112 based on the characteristics of the current user. The machine learning process trains the assistance offering recommendation model 122 based on characteristics of historical users of the data management system and rates at which those historical users selected the assistance offerings to which they were exposed.

In one embodiment, the data management system 112 trains the assistance offering recommendation model 122 with a multivariate random forest regression machine learning process. The multivariate random forest regression machine learning process is a supervised machine learning process by which the data management system 112 trains the assistance offering recommendation model 122 to identify assistance offerings that are likely to be relevant to a current user of the data management system 112 based on the characteristics of the current user and selections made by historical users that are similar to the current user.

In one embodiment, the assistance offering recommendation model 122 receives training set data 138 for training the assistance offering recommendation model 122 in accordance with the multivariate random forest regression machine learning process. The multivariate random forest regression machine learning process utilizes the training set data 138 to train the assistance offering recommendation model 122 to identify assistance offerings from the assistance offering database 120 that are likely to be relevant to a current user.

In one embodiment, the training set data includes historical profile data 140. The historical profile data 140 includes a respective profile for each of a plurality of historical users of the data management system 112. Each profile from the historical profile data 140 includes data related to characteristics of a respective historical user. The historical profile data 140 is retrieved from the user data 134 stored in the user database 118 and formatted for inclusion in the training set data 138.

In one embodiment, the training set data 138 includes historical selection data 142. The historical selection data 142 indicates how often, or if, each historical user from the historical profile data 140 selected assistance offerings to which they were exposed. In one embodiment the historical selection data 142 includes, for each historical user, and each assistance offering, a respective selection score. In one embodiment, the selection score is, for a particular historical user and a particular assistance offering, a ratio of the number of times that the historical user selected the assistance offering and the number of times that the historical user was exposed to the assistance offering.

In one embodiment, the multivariate random forest regression machine learning process takes as input the historical profile data 140 and generates output data. The machine learning process trains the assistance offering recommendation model 122 to generate output data that matches the historical selection data 142. Accordingly, the multivariate random forest regression machine learning process generates output data in iterations and compares the output data to the historical selection data 142 in a process to eventually learn the functions that result in the generation of output data that matches the historical selection data 142 within a selected accuracy threshold.

In one embodiment, when the assistance offering recommendation model 122 has been trained to accurately reproduce the historical selection data 142, the assistance offering recommendation model 122 can receive current user profile data 146 corresponding to attributes of a current user, can process the current user profile data, and generate an output that indicates the likelihood that the user would select each assistance offering. The assistance offerings with the highest score or value correspond to the assistance offerings that the user is most likely to select if the user is exposed to the assistance offering. The assistance offering recommendation model 122 generates assistance offering recommendation data 148 indicating one or more of the highest rated assistance offerings, corresponding to the assistance offerings that the current user is most likely to find relevant.

In many cases, the historical selection data 142 can include selection scores for various assistance offerings and historical users with a value of zero. These zero values can result in problems in training the assistance offering recommendation model 122 to accurately learn to identify assistance offerings that are most likely to be relevant to the current user. This is because, absent the disclosed embodiments, a first historical user that is exposed to a particular assistance offering a single time and does not select it will have the same selection score for that assistance offering as a second historical user that is exposed to the assistance offering 100 times and has not selected it. Absent the disclosed embodiments, in both cases, the selection score is zero. Even though the selection score is zero in both cases, this can be misleading because it is possible that if the first historical user is exposed to the assistance offering 100 times, the first historical user would select the assistance offering several times. In short, declining an assistance offering on one occasion is not equivalent to declining an assistance offering 100 times and is not as solid an indication of a user's preferences as declining an offer 100 times. Thus, these zero values can result in deficiencies in the training of the assistance offering recommendation model 122.

In one embodiment, the data management system 112 improves the effectiveness of the multivariate random forest regression machine learning process by replacing zero values for the selection scores with selection scores that have negative values that vary based on the number of times that the historical user was exposed to the assistance offering. Accordingly, the assistance offering recommendation model 122 generates negative selection score data 144 that includes, for each zero value in the historical selection data 142, a negative selection score with a negative value based on the number of times that the historical user was exposed to the assistance offering. The assistance offering recommendation model 122 is then trained with the multivariate random forest regression machine learning process using negative selection scores in place of the zero value selection scores.

In one embodiment, the random forest machine learning process calculates the negative selection score values based on a formula that is a function of a coefficient α and the number of times Z that the historical user was exposed to the assistance offering. In one embodiment, a coefficient α is also utilized in the formulas learned by the assistance offering recommendation model 122 during the machine learning process to reproduce the positive value selection scores. During the machine learning process, the assistance offering recommendation model 122 learns a satisfactory value for the coefficient α that results in sufficiently accurate reproduction of the historical selection data 142. The multivariate random forest regression machine learning process that includes the substitution of negative selection score values for zero selection score values results in assistance offering recommendation model 122 that is significantly more accurate in generating assistance offering recommendation data 148 that identifies assistance offerings that are likely to be relevant to the current user. The assistance offering recommendation model 122 outputs the personalized assistance offering data 133 that includes one or more of the assistance offerings identified in the assistance offering recommendation data 148 as most likely to be relevant to the current user.

In one embodiment, the multivariate random forest regression machine learning process utilizes an exponential function to generate the negative selection score data 144, such as the exponential function:

$$F(Z) = -1 * (1.0 - e^{\alpha * Z * Z})$$

This formula results in a negative selection score having a value between 0 and −1. A greater number of exposures Z results in a number closer to −1. A smaller number of exposures Z results in a number closer to 0.

In one embodiment, the function F(Z) can be a function other than an exponential function. In one embodiment, the function can include a quadratic function including a and Z. In one embodiment, the function can include a linear function including a and Z. In one embodiment, the function can include a Bernoulli distribution. In one embodiment, the function can include an Agresti-Coull formula. The function F(Z) can include other functions not listed here, as will be apparent to those of skill in the art in light of the present disclosure.

In one embodiment, the data management system 112 receives or generates new assistance offering data related to new assistance offerings for which the historical selection data is either inadequate or entirely absent in other words, there is not sufficient selection history to determine whether or not the current user is likely to find a new assistance offering relevant based on historical selection data director related to the new assistance offering. In one embodiment, the data management system 112 is able to determine the relevance of the new assistance offering by including in the training set data 138 assistance offering characteristics data. The assistance offering characteristics data includes data indicating the characteristics of the assistance offerings. The assistance offering characteristics data can include, for each assistance offering, data indicating characteristics such as the category of the assistance offering, the title of the assistance offering, a format of the assistance offering, the content of the assistance offering, and other possible characteristics of the assistance offering.

In one embodiment, the multivariate random forest regression process trains the assistance offering recommendation model 122 based on the assistance offering characteristics data. The assistance offering recommendation model 122 learns to identify which assistance offerings are similar to each other and whether a new assistance offering is likely to be relevant to a user based on if similar assistance offerings are likely to be relevant to the user. Accordingly, in one embodiment, the assistance offering recommendation model 122 generates assistance offering recommendation data 148 including the new assistance offering if the new assistance offering is similar to one or more assistance offerings that are likely to be relevant to the user.

In one embodiment, the assistance offering characteristics data can be manually specified or automatically learned from the assistance offering attributes, such as title or description, using word frequency count, or term frequency-inverse document frequency calculated from different combinations of engrams, or even topics learned from topic modeling techniques. In one embodiment, the assistance offering recommendation model uses sent2vec or long short term memory recurrent neural network (LSTM-RNN) the form semantic representations of the description. The training procedure of the assistance offering recommendation model is to learn the mapping from the union of historical profile data and the assistance offering characteristics data for which relevant historical selection data 142 exists. In this way, the data management system 112 can recommend new assistance offerings for which sufficient historical selection data 142 does not yet exist.

Figure 2:
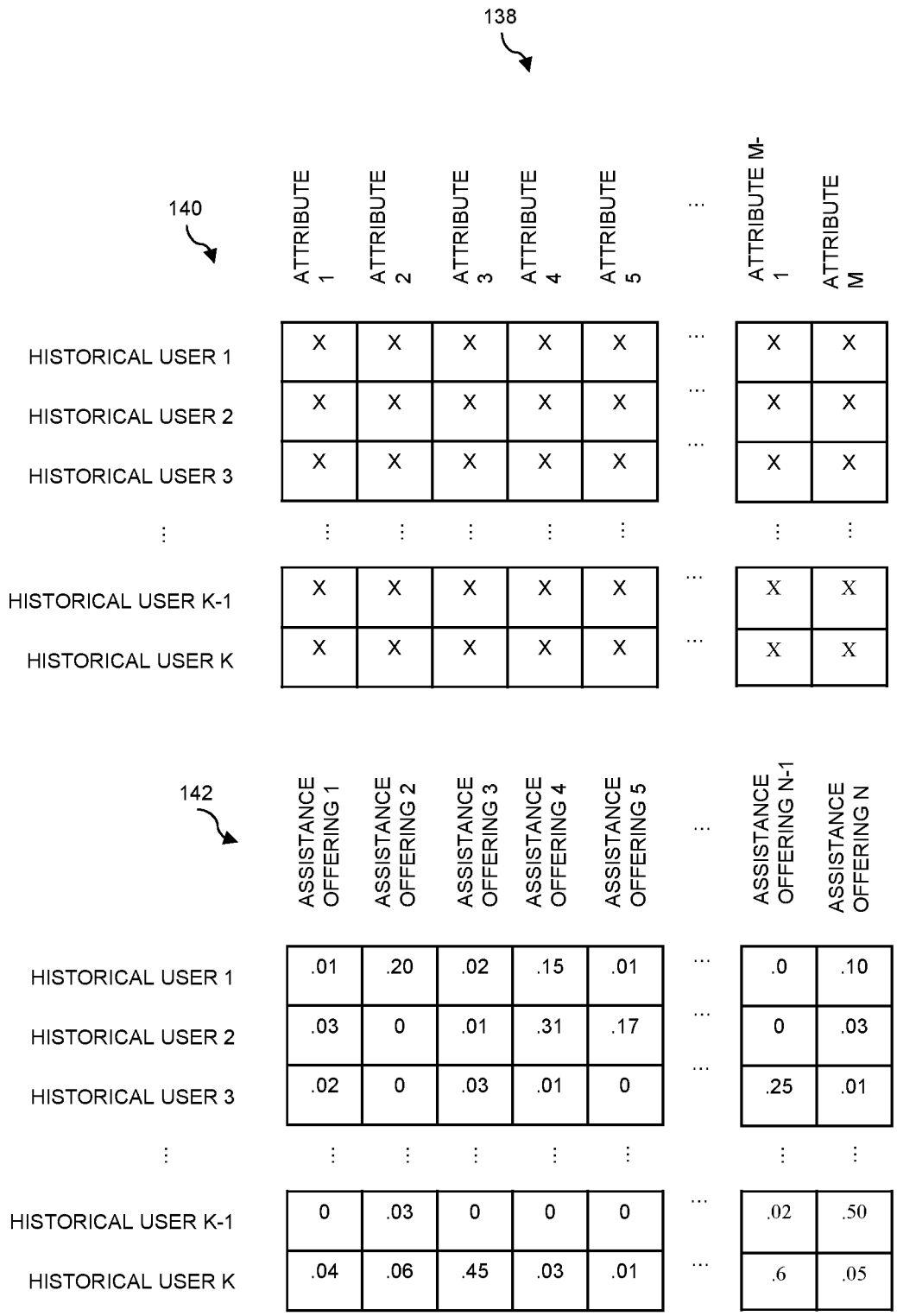
FIG. 2 is a representation of training set data for identifying relevant assistance offerings for users of a data management system based on a machine learning process, in accordance with one embodiment.

FIG. 2 is an illustration of training set data 138 generated for the multivariate random forest regression machine learning process for training the assistance offering recommendation model 122. With reference to FIG. 1 and FIG. 2 The training set data 138 includes historical profile data 140 and historical selection data 142.

In one embodiment, the historical profile data 140 includes a series of K row vectors, one for each historical user represented in the training set data 138. Each row vector has a data field for each of M attributes. Each attribute corresponds to characteristic of the historical user as reflected in the historical user profile associated with the historical user. Thus, the attributes can correspond to various demographic, financial, clickstream, or other characteristics of the historical users, according to various embodiments. In the example of FIG. 2, the data fields in the historical profile data are each populated with "X" for simplicity. In practice, the data fields have a variety of data values.

In one embodiment, the historical selection data 142 includes a series of K row vectors, one for each historical user represented in the training set data 138. Each row vector has a data field for each of M assistance offerings to which the historical users have been previously exposed by the data management system 112. Each data field in the historical selection data 142 corresponds to a selection score. The selection score indicates the number of times that a historical user selected an assistance offering, divided by the number of times the historical user was exposed to the assistance offering. Thus, each selection score is a ratio with a value between 0 and 1.

Many of the data fields have a selection score of 0. The selection score of 0 indicates that the historical user never selected, i.e. never clicked on, the corresponding assistance offering. For example, neither historical user 2 nor historical user 3 selected assistance offering 2. However, the training set data indicates that historical user 2 was exposed to assistance offering 2 thirty three times while historical user 3 was exposed to assistance offering 2 only twice. Thus, the common value of 0 does not provide adequate information.

Figure 3:
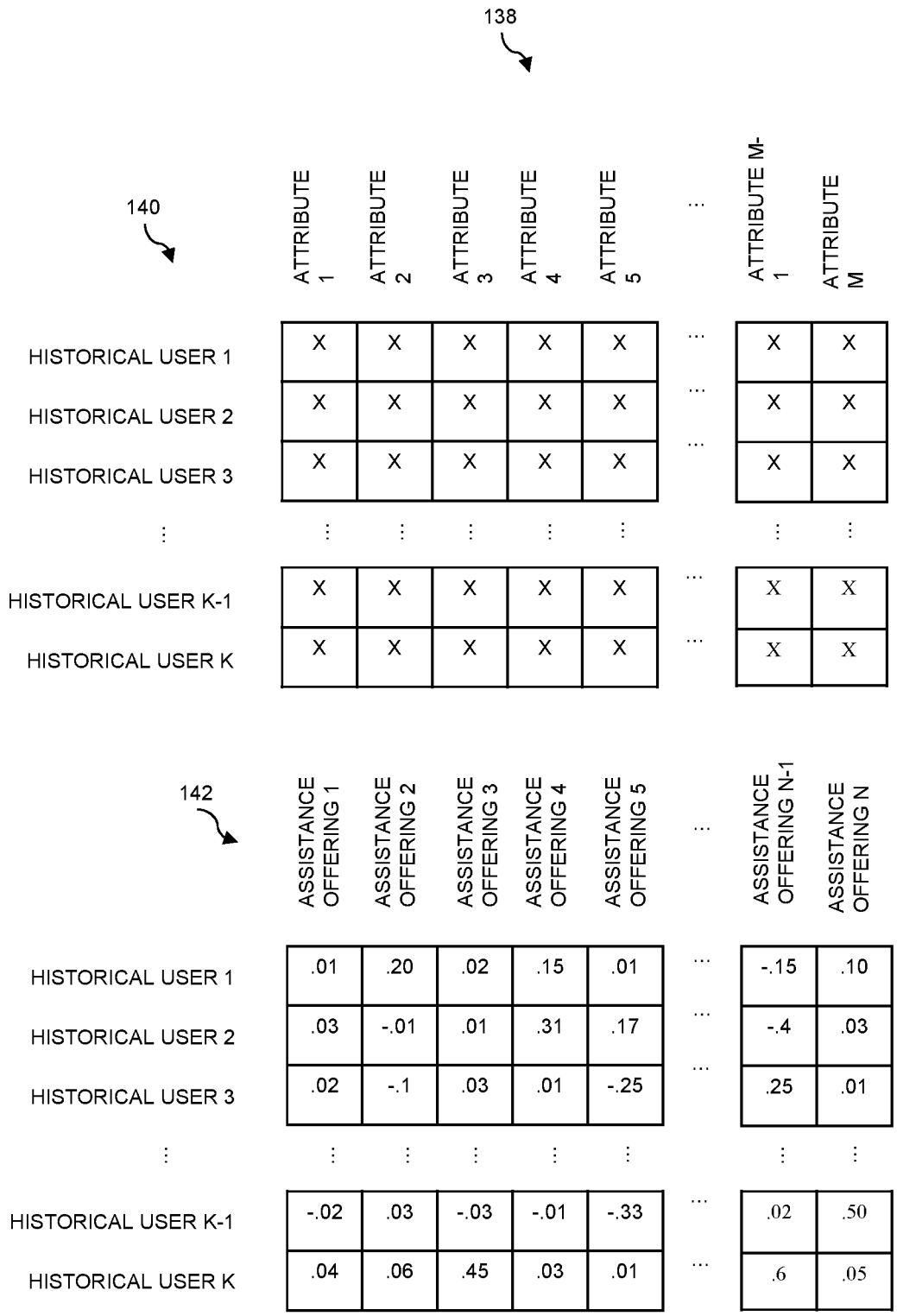
FIG. 3 is a representation of training set data for identifying relevant assistance offerings for users of a data management system based on a machine learning process, in accordance with one embodiment.

FIG. 3 includes the training set data 138 from FIG. 2, in which, according to one embodiment, the 0 values from the historical selection data 142 have been replaced with negative selection values. With reference to FIGS. 1-3, in one embodiment, the machine learning process has utilized a function F(Z), as described previously, in order to generate negative selection scores including negative numbers and has replaced the 0 values with the negative numbers. The machine learning process iteratively processes the historical profile data 140 until the machine learning process has learned a satisfactory value for a.

In one embodiment, collaborative filtering is a recommendation algorithm that ranks the assistance offers based on the historical users click history. However, collaborative filtering does not generate effective recommendations for new users that do not yet have any click history. The assistance offering recommendation model 122, according to one embodiment, incorporates user level features to recommend more relevant assistance offerings to new users based on the click history of historical users that have similar user level features such as user tenure time with the data management system 112, number of connected applications, number of employees, etc.

In one embodiment, the click through rate is used as a proxy of the historical users' preferences for an assistance offering. In one embodiment, the click through rate is defined by the number of clicks on a particular assistance offering by a particular historical user divided by the number of exposures that the historical user has had to the assistance offering.

In one embodiment, the training procedure of the multivariate model learns the mapping from the user level features to the click through rate for all historical users and assistance offerings. In one embodiment, the training procedure attempts to minimize the root mean squared error of the click through rate.

In one embodiment, in order to assist and making effective assistance offering recommendations when new assistance offerings are introduced before adequate numbers of clicks are collected, the machine learning process incorporates additional item level features (i.e. assistance offering characteristics data) into the multivariate random forest regressions structure. The item level features can be manually specified or automatically learned from item attributes such as title or description using word frequency count, or term frequency-inverse document frequency calculated from different combinations of ngrams, or topics learned from topic modeling techniques. In one embodiment, the training process can use sent2vec (sentence to vector) or LSTM-RNN (Long Short-Term Memory-Recurrent Neural Network) to form semantic representations of the description.

In one embodiment, the training procedure have the multivariate model is to learn the mapping from the union of user level features and item level features for the pairs of all assistance offerings that historical users have clicked on.

In one embodiment, the click through rate is used as the proxy for historical users' preferences to the assistance offerings. However, the click through rate will always be 0 if the user hasn't clicked on an assistance offering, no matter how many impressions the historical user has had. In one embodiment, the number of impressions is also used as a proxy of the historical users' preferences. For example, if an assistance offering has been presented to a historical user many times, then this is an indicator that the offer is not relevant to the historical user.

In one embodiment, the machine learning process uses a discount function to convert impressions with no clicks to a negative click through rate. The negative click through rate is a negative number with a value between −1 and 0 that is used together with the click through rate in the assistance offering recommendation model. In one embodiment, the discount function can be a linear function, a quadratic function, or an exponential function. The function uses the number of exposures or impressions and the decay constant or coefficient $\alpha$. The training process learns and acceptable value of $\alpha$.

In one embodiment, using the discount function, the machine learning process can generate samples that have a negative click through rates to train the assistance offering recommendation model 122. On one hand this increases the samples used in cases where historical users have not clicked on or selected a particular assistance offering. On the other hand, this can also better learn user preferences if the number of impressions or exposures is discounted properly.

In one embodiment, the machine learning process utilizes a normalized discounted cumulative gain (NDCG) metric to evaluate the performance of the assistance offering recommendation model 122. Assistance offerings that are more relevant will have a higher relevance score and will appear at the top of the list of recommended assistance offerings in the assistance offering recommendation data 148.

In one embodiment, if there is no rating for the assistance offerings, then a binary relevance is calculated.

Embodiments of the present disclosure address some of the shortcomings associated with traditional data management systems by providing a data management system that utilizes supervised machine learning processes in order to provide relevant assistance offerings to users. The various embodiments of the disclosure can be implemented to improve the technical fields of electronic data management, data processing, data transmission, and data storage. Therefore, the various described embodiments of the disclosure and their associated benefits amount to significantly more than an abstract idea. In particular, by providing relevant personalized assistance offerings, electronic data management is significantly improved.

Figure 4:
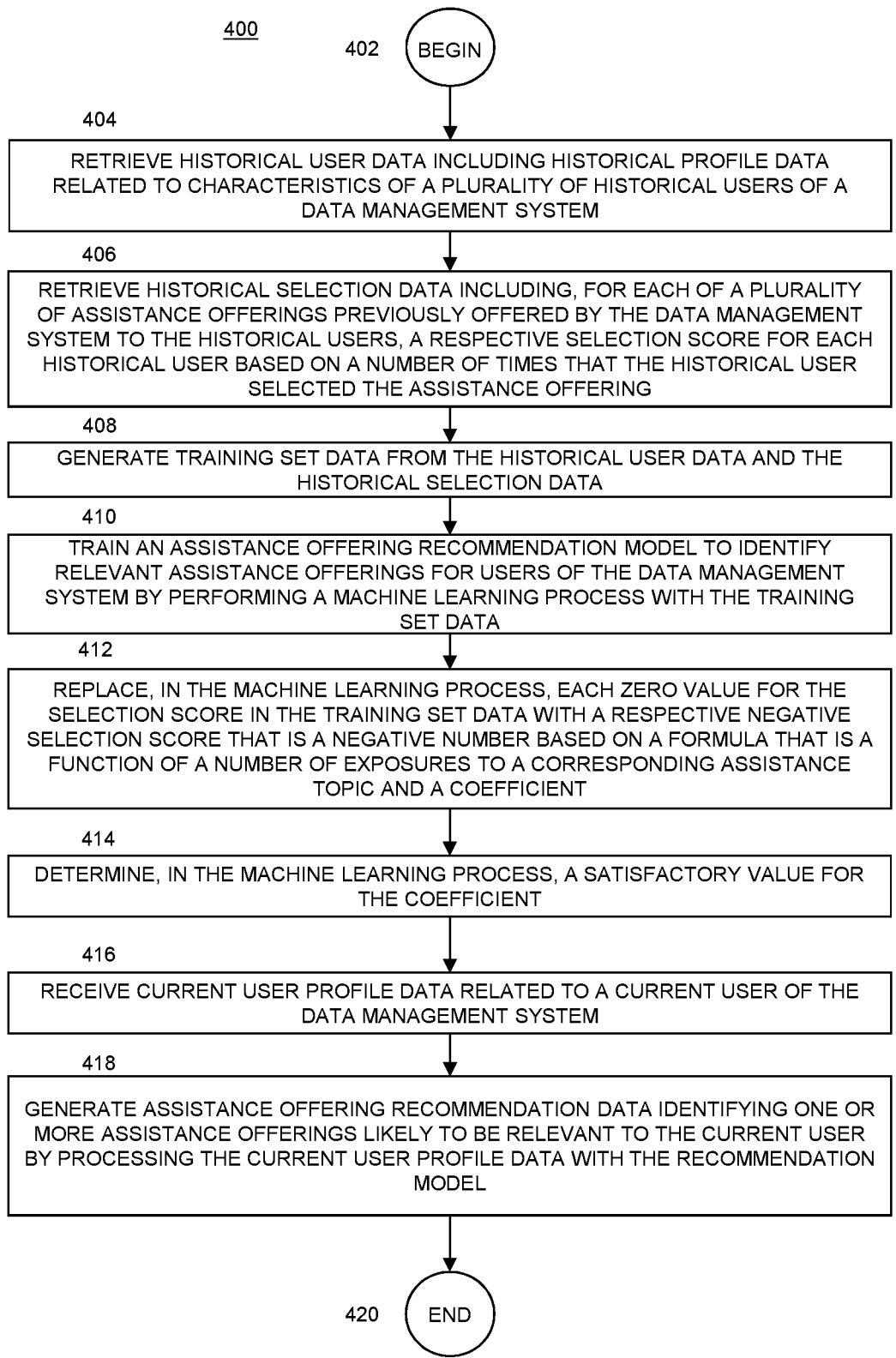
FIG. 4 is a flow diagram of a process for identifying relevant assistance offerings for users of a data management system based on a machine learning process, in accordance with one embodiment.

FIG. 4 illustrates a flow diagram of a process 400 for identifying relevant assistance offerings for users of a data management system based on a machine learning process, according to various embodiments.

Referring to FIGS. 1-4, and the description of FIGS. 1-3 above, in one embodiment, process 400 begins at BEGIN 402 and process flow proceeds to RETRIEVE HISTORICAL USER DATA INCLUDING HISTORICAL PROFILE DATA RELATED TO CHARACTERISTICS OF A PLURALITY OF HISTORICAL USERS OF A DATA MANAGEMENT SYSTEM 404.

In one embodiment, at RETRIEVE HISTORICAL USER DATA INCLUDING HISTORICAL PROFILE DATA RELATED TO CHARACTERISTICS OF A PLURALITY OF HISTORICAL USERS OF A DATA MANAGEMENT SYSTEM 404, historical user data is retrieved including historical profile data related to characteristics of a plurality of historical users of a data management system, using any of the methods, processes, and procedures discussed above with respect to FIGS. 1-3.

In one embodiment, once historical user data is retrieved including historical profile data related to characteristics of a plurality of historical users of a data management system at RETRIEVE HISTORICAL USER DATA INCLUDING HISTORICAL PROFILE DATA RELATED TO CHARACTERISTICS OF A PLURALITY OF HISTORICAL USERS OF A DATA MANAGEMENT SYSTEM 404 process flow proceeds to RETRIEVE HISTORICAL SELECTION DATA INCLUDING, FOR EACH OF A PLURALITY OF ASSISTANCE OFFERINGS PREVIOUSLY OFFERED BY THE DATA MANAGEMENT SYSTEM TO THE HISTORICAL USERS, A RESPECTIVE SELECTION SCORE FOR EACH HISTORICAL USER BASED ON A NUMBER OF TIMES THAT THE HISTORICAL USER SELECTED THE ASSISTANCE OFFERING 406.

In one embodiment, at RETRIEVE HISTORICAL SELECTION DATA INCLUDING, FOR EACH OF A PLURALITY OF ASSISTANCE OFFERINGS PREVIOUSLY OFFERED BY THE DATA MANAGEMENT SYSTEM TO THE HISTORICAL USERS, A RESPECTIVE SELECTION SCORE FOR EACH HISTORICAL USER BASED ON A NUMBER OF TIMES THAT THE HISTORICAL USER SELECTED THE ASSISTANCE OFFERING 406, historical selection data is retrieved including, for each of a plurality of assistance offerings previously offered by the data management system to the historical users, a respective selection score for each historical user based on a number of times that the historical user selected the assistance offering, using any of the methods, processes, and procedures discussed above with respect to FIGS. 1-3.

In one embodiment, once historical selection data is retrieved including, for each of a plurality of assistance offerings previously offered by the data management system to the historical users, a respective selection score for each historical user based on a number of times that the historical user selected the assistance offering at RETRIEVE HISTORICAL SELECTION DATA INCLUDING, FOR EACH OF A PLURALITY OF ASSISTANCE OFFERINGS PREVIOUSLY OFFERED BY THE DATA MANAGEMENT SYSTEM TO THE HISTORICAL USERS, A RESPECTIVE SELECTION SCORE FOR EACH HISTORICAL USER BASED ON A NUMBER OF TIMES THAT THE HISTORICAL USER SELECTED THE ASSISTANCE OFFERING 406, process flow proceeds to GENERATE TRAINING SET DATA FROM THE HISTORICAL USER DATA AND THE HISTORICAL SELECTION DATA 408.

In one embodiment, at GENERATE TRAINING SET DATA FROM THE HISTORICAL USER DATA AND THE HISTORICAL SELECTION DATA 408, training set data is generated from the historical user data and the historical selection data, using any of the methods, processes, and procedures discussed above with respect to FIGS. 1-3.

In one embodiment, once training set data is generated from the historical user data and the historical selection data at GENERATE TRAINING SET DATA FROM THE HISTORICAL USER DATA AND THE HISTORICAL SELECTION DATA 408, process flow proceeds to TRAIN AN ASSISTANCE OFFERING RECOMMENDATION MODEL TO IDENTIFY RELEVANT ASSISTANCE OFFERINGS FOR USERS OF THE DATA MANAGEMENT SYSTEM BY PERFORMING A MACHINE LEARNING PROCESS WITH THE TRAINING SET DATA 410.

In one embodiment, at TRAIN AN ASSISTANCE OFFERING RECOMMENDATION MODEL TO IDENTIFY RELEVANT ASSISTANCE OFFERINGS FOR USERS OF THE DATA MANAGEMENT SYSTEM BY PERFORMING A MACHINE LEARNING PROCESS WITH THE TRAINING SET DATA 410, an assistance offering recommendation model is trained to identify relevant assistance offerings for users of the data management system by performing a machine learning process with the training set data, using any of the methods, processes, and procedures discussed above with respect to FIGS. 1-3.

In one embodiment, once an assistance offering recommendation model is trained to identify relevant assistance offerings for users of the data management system by performing a machine learning process with the training set data at TRAIN AN ASSISTANCE OFFERING RECOMMENDATION MODEL TO IDENTIFY RELEVANT ASSISTANCE OFFERINGS FOR USERS OF THE DATA MANAGEMENT SYSTEM BY PERFORMING A MACHINE LEARNING PROCESS WITH THE TRAINING SET DATA 410, process flow proceeds to REPLACE, IN THE MACHINE LEARNING PROCESS, EACH ZERO VALUE FOR THE SELECTION SCORE IN THE TRAINING SET DATA WITH A RESPECTIVE NEGATIVE SELECTION SCORE THAT IS A NEGATIVE NUMBER BASED ON A FORMULA THAT IS A FUNCTION OF A NUMBER OF EXPOSURES TO A CORRESPONDING ASSISTANCE TOPIC AND A COEFFICIENT 412.

In one embodiment, at REPLACE, IN THE MACHINE LEARNING PROCESS, EACH ZERO VALUE FOR THE SELECTION SCORE IN THE TRAINING SET DATA WITH A RESPECTIVE NEGATIVE SELECTION SCORE THAT IS A NEGATIVE NUMBER BASED ON A FORMULA THAT IS A FUNCTION OF A NUMBER OF EXPOSURES TO A CORRESPONDING ASSISTANCE TOPIC AND A COEFFICIENT 412, in the machine learning process, each zero value for the selection score is replaced in the training set data with a respective negative selection score that is a negative number based on a formula that is a function of a number of exposures to a corresponding assistance topic and a coefficient, using any of the methods, processes, and procedures discussed above with respect to FIGS. 1-3.

In one embodiment, once in the machine learning process, each zero value for the selection score is replaced in the training set data with a respective negative selection score that is a negative number based on a formula that is a function of a number of exposures to a corresponding assistance topic and a coefficient at REPLACE, IN THE MACHINE LEARNING PROCESS, EACH ZERO VALUE FOR THE SELECTION SCORE IN THE TRAINING SET DATA WITH A RESPECTIVE NEGATIVE SELECTION SCORE THAT IS A NEGATIVE NUMBER BASED ON A FORMULA THAT IS A FUNCTION OF A NUMBER OF EXPOSURES TO A CORRESPONDING ASSISTANCE TOPIC AND A COEFFICIENT 412, process flow proceeds to DETERMINE, IN THE MACHINE LEARNING PROCESS, A SATISFACTORY VALUE FOR THE COEFFICIENT 414.

In one embodiment, at DETERMINE, IN THE MACHINE LEARNING PROCESS, A SATISFACTORY VALUE FOR THE COEFFICIENT 414, in the machine learning process, a satisfactory value for the coefficient is determined, using any of the methods, processes, and procedures discussed above with respect to FIGS. 1-3.

In one embodiment, once, in the machine learning process, a satisfactory value for the coefficient is determined at DETERMINE, IN THE MACHINE LEARNING PROCESS, A SATISFACTORY VALUE FOR THE COEFFICIENT 414, process flow proceeds to RECEIVE CURRENT USER PROFILE DATA RELATED TO A CURRENT USER OF THE DATA MANAGEMENT SYSTEM 416.

In one embodiment, at RECEIVE CURRENT USER PROFILE DATA RELATED TO A CURRENT USER OF THE DATA MANAGEMENT SYSTEM 416, current user profile data related to a current user of the data management system is received, using any of the methods, processes, and procedures discussed above with respect to FIGS. 1-3.

In one embodiment, once, current user profile data related to a current user of the data management system is received at RECEIVE CURRENT USER PROFILE DATA RELATED TO A CURRENT USER OF THE DATA MANAGEMENT SYSTEM 416, process flow proceeds to GENERATE ASSISTANCE OFFERING RECOMMENDATION DATA IDENTIFYING ONE OR MORE ASSISTANCE OFFERINGS LIKELY TO BE RELEVANT TO THE CURRENT USER BY PROCESSING THE CURRENT USER PROFILE DATA WITH THE RECOMMENDATION MODEL 418.

In one embodiment, at GENERATE ASSISTANCE OFFERING RECOMMENDATION DATA IDENTIFYING ONE OR MORE ASSISTANCE OFFERINGS LIKELY TO BE RELEVANT TO THE CURRENT USER BY PROCESSING THE CURRENT USER PROFILE DATA WITH THE RECOMMENDATION MODEL 418 assistance offering recommendation data is generated identifying one or more assistance offerings likely to be relevant to the current user by processing the current user profile data with the recommendation model, using any of the methods, processes, and procedures discussed above with respect to FIGS. 1-3.

In one embodiment, once assistance offering recommendation data is generated identifying one or more assistance offerings likely to be relevant to the current user by processing the current user profile data with the recommendation model at GENERATE ASSISTANCE OFFERING RECOMMENDATION DATA IDENTIFYING ONE OR MORE ASSISTANCE OFFERINGS LIKELY TO BE RELEVANT TO THE CURRENT USER BY PROCESSING THE CURRENT USER PROFILE DATA WITH THE RECOMMENDATION MODEL 418, process flow proceeds to END 420.

In one embodiment, at END 420 the process for identifying relevant assistance offerings for users of a data management system based on a machine learning process is exited to await new data and/or instructions.

Figure 5:
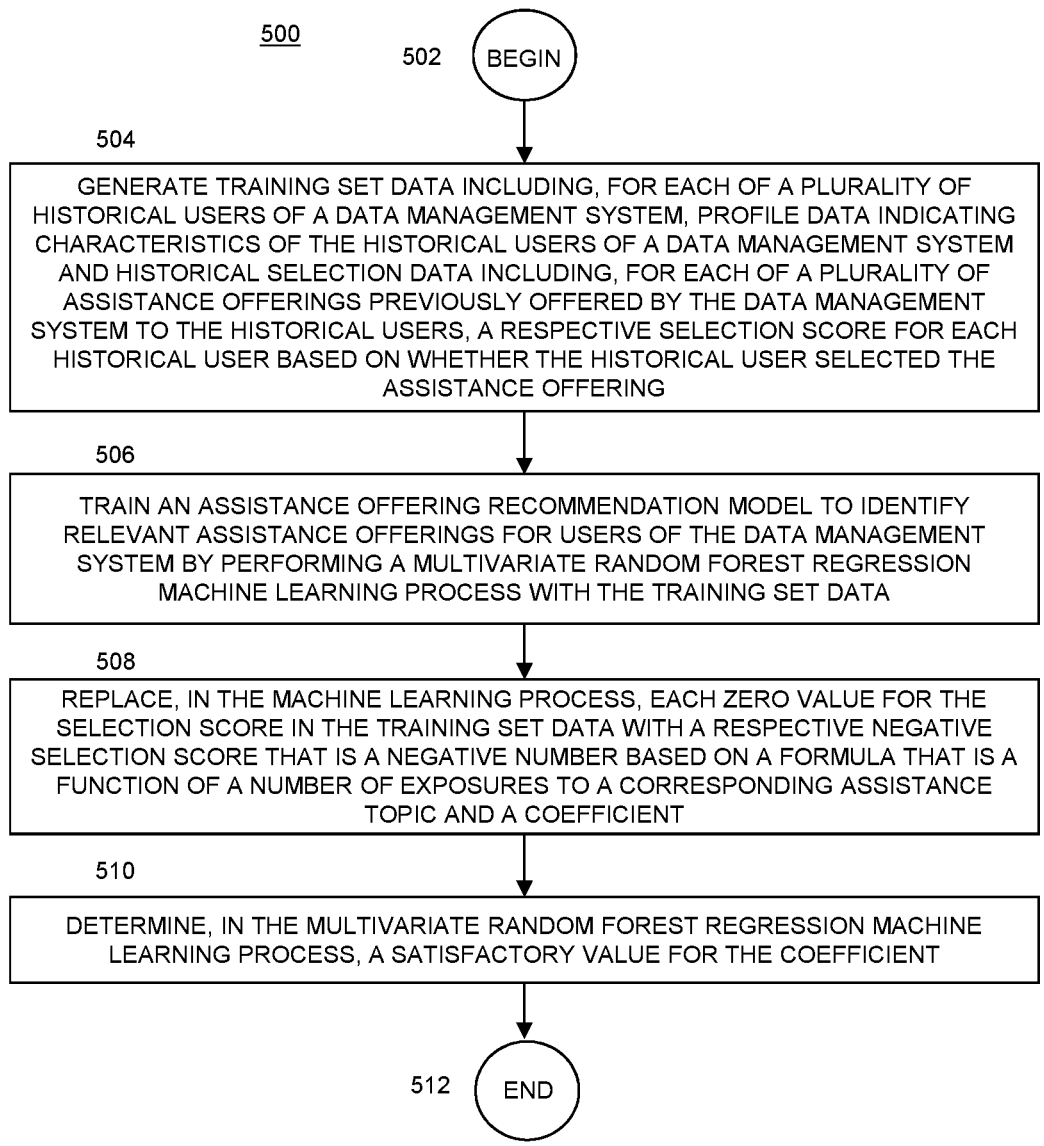
FIG. 5 is a flow diagram of a process for identifying relevant assistance offerings for users of a data management system based on a machine learning process, in accordance with one embodiment.

FIG. 5 illustrates a flow diagram of a process 500 for identifying relevant assistance offerings for users of a data management system based on a machine learning process, according to various embodiments.

Referring to FIGS. 1-3 and 5, and the description of FIGS. 1-3 above, in one embodiment, process 500 begins at BEGIN 502 and process flow proceeds to GENERATE TRAINING SET DATA INCLUDING, FOR EACH OF A PLURALITY OF HISTORICAL USERS OF A DATA MANAGEMENT SYSTEM, PROFILE DATA INDICATING CHARACTERISTICS OF THE HISTORICAL USERS OF A DATA MANAGEMENT SYSTEM AND HISTORICAL SELECTION DATA INCLUDING, FOR EACH OF A PLURALITY OF ASSISTANCE OFFERINGS PREVIOUSLY OFFERED BY THE DATA MANAGEMENT SYSTEM TO THE HISTORICAL USERS, A RESPECTIVE SELECTION SCORE FOR EACH HISTORICAL USER BASED ON WHETHER THE HISTORICAL USER SELECTED THE ASSISTANCE OFFERING 504.

In one embodiment, at GENERATE TRAINING SET DATA INCLUDING, FOR EACH OF A PLURALITY OF HISTORICAL USERS OF A DATA MANAGEMENT SYSTEM, PROFILE DATA INDICATING CHARACTERISTICS OF THE HISTORICAL USERS OF A DATA MANAGEMENT SYSTEM AND HISTORICAL SELECTION DATA INCLUDING, FOR EACH OF A PLURALITY OF ASSISTANCE OFFERINGS PREVIOUSLY OFFERED BY THE DATA MANAGEMENT SYSTEM TO THE HISTORICAL USERS, A RESPECTIVE SELECTION SCORE FOR EACH HISTORICAL USER BASED ON WHETHER THE HISTORICAL USER SELECTED THE ASSISTANCE OFFERING 504, training set data is generated including, for each of a plurality of historical users of a data management system, profile data indicating characteristics of the historical users of a data management system and historical selection data including, for each of a plurality of assistance offerings previously offered by the data management system to the historical users, a respective selection score for each historical user based on whether the historical user selected the assistance offering, using any of the methods, processes, and procedures discussed above with respect to FIGS. 1-3.

In one embodiment, once training set data is generated including, for each of a plurality of historical users of a data management system, profile data indicating characteristics of the historical users of a data management system and historical selection data including, for each of a plurality of assistance offerings previously offered by the data management system to the historical users, a respective selection score for each historical user based on whether the historical user selected the assistance offering at GENERATE TRAINING SET DATA INCLUDING, FOR EACH OF A PLURALITY OF HISTORICAL USERS OF A DATA MANAGEMENT SYSTEM, PROFILE DATA INDICATING CHARACTERISTICS OF THE HISTORICAL USERS OF A DATA MANAGEMENT SYSTEM AND HISTORICAL SELECTION DATA INCLUDING, FOR EACH OF A PLURALITY OF ASSISTANCE OFFERINGS PREVIOUSLY OFFERED BY THE DATA MANAGEMENT SYSTEM TO THE HISTORICAL USERS, A RESPECTIVE SELECTION SCORE FOR EACH HISTORICAL USER BASED ON WHETHER THE HISTORICAL USER SELECTED THE ASSISTANCE OFFERING 504 process flow proceeds to TRAIN AN ASSISTANCE OFFERING RECOMMENDATION MODEL TO IDENTIFY RELEVANT ASSISTANCE OFFERINGS FOR USERS OF THE DATA MANAGEMENT SYSTEM BY PERFORMING A MULTIVARIATE RANDOM FOREST REGRESSION MACHINE LEARNING PROCESS WITH THE TRAINING SET DATA 506.

In one embodiment, at TRAIN AN ASSISTANCE OFFERING RECOMMENDATION MODEL TO IDENTIFY RELEVANT ASSISTANCE OFFERINGS FOR USERS OF THE DATA MANAGEMENT SYSTEM BY PERFORMING A MULTIVARIATE RANDOM FOREST REGRESSION MACHINE LEARNING PROCESS WITH THE TRAINING SET DATA 506, an assistance offering recommendation model is trained to identify relevant assistance offerings for users of the data management system by performing a multivariate random forest regression machine learning process with the training set data, using any of the methods, processes, and procedures discussed above with respect to FIGS. 1-3.

In one embodiment, once an assistance offering recommendation model is trained to identify relevant assistance offerings for users of the data management system by performing a multivariate random forest regression machine learning process with the training set data at TRAIN AN ASSISTANCE OFFERING RECOMMENDATION MODEL TO IDENTIFY RELEVANT ASSISTANCE OFFERINGS FOR USERS OF THE DATA MANAGEMENT SYSTEM BY PERFORMING A MULTIVARIATE RANDOM FOREST REGRESSION MACHINE LEARNING PROCESS WITH THE TRAINING SET DATA 506, process flow proceeds to REPLACE, IN THE MACHINE LEARNING PROCESS, EACH ZERO VALUE FOR THE SELECTION SCORE IN THE TRAINING SET DATA WITH A RESPECTIVE NEGATIVE SELECTION SCORE THAT IS A NEGATIVE NUMBER BASED ON A FORMULA THAT IS A FUNCTION OF A NUMBER OF EXPOSURES TO A CORRESPONDING ASSISTANCE TOPIC AND A COEFFICIENT 508.

In one embodiment, at REPLACE, IN THE MACHINE LEARNING PROCESS, EACH ZERO VALUE FOR THE SELECTION SCORE IN THE TRAINING SET DATA WITH A RESPECTIVE NEGATIVE SELECTION SCORE THAT IS A NEGATIVE NUMBER BASED ON A FORMULA THAT IS A FUNCTION OF A NUMBER OF EXPOSURES TO A CORRESPONDING ASSISTANCE TOPIC AND A COEFFICIENT 508, in the machine learning process, each zero value for the selection score is replaced in the training set data with a respective negative selection score that is a negative number based on a formula that is a function of a number of exposures to a corresponding assistance topic and a coefficient, using any of the methods, processes, and procedures discussed above with respect to FIGS. 1-3.

In one embodiment, once in the machine learning process, each zero value for the selection score is replaced in the training set data with a respective negative selection score that is a negative number based on a formula that is a function of a number of exposures to a corresponding assistance topic and a coefficient at REPLACE, IN THE MACHINE LEARNING PROCESS, EACH ZERO VALUE FOR THE SELECTION SCORE IN THE TRAINING SET DATA WITH A RESPECTIVE NEGATIVE SELECTION SCORE THAT IS A NEGATIVE NUMBER BASED ON A FORMULA THAT IS A FUNCTION OF A NUMBER OF EXPOSURES TO A CORRESPONDING ASSISTANCE TOPIC AND A COEFFICIENT 508, process flow proceeds to DETERMINE, IN THE MULTIVARIATE RANDOM FOREST REGRESSION MACHINE LEARNING PROCESS, A SATISFACTORY VALUE FOR THE COEFFICIENT 510.

In one embodiment, at DETERMINE, IN THE MULTIVARIATE RANDOM FOREST REGRESSION MACHINE LEARNING PROCESS, A SATISFACTORY VALUE FOR THE COEFFICIENT 510, in the multivariate random forest regression machine learning process, a satisfactory value for the coefficient is determined, using any of the methods, processes, and procedures discussed above with respect to FIGS. 1-3.

In one embodiment, once in the multivariate random forest regression machine learning process, a satisfactory value for the coefficient is determined at DETERMINE, IN THE MULTIVARIATE RANDOM FOREST REGRESSION MACHINE LEARNING PROCESS, A SATISFACTORY VALUE FOR THE COEFFICIENT 510, process flow proceeds to process flow proceeds to END 512.

In one embodiment, at END 512 the process for identifying relevant assistance offerings for users of a data management system based on a machine learning process is exited to await new data and/or instructions.

As noted above, the specific illustrative examples discussed above are but illustrative examples of implementations of embodiments of the method or process for identifying relevant assistance offerings for users of a data management system based on a machine learning process. Those of skill in the art will readily recognize that other implementations and embodiments are possible. Therefore, the discussion above should not be construed as a limitation on the claims provided below.

In one embodiment, a computing system implemented method identifies relevant assistance offerings for users of a data management system based on a machine learning process. The method includes retrieving historical user data including historical profile data related to characteristics of a plurality of historical users of a data management system and retrieving historical selection data including, for each of a plurality of assistance offerings previously offered by the data management system to the historical users, a respective selection score for each historical user based on a number of times that the historical user selected the assistance offering. The method includes generating training set data from the historical user data and the historical selection data and training an assistance offering recommendation model to identify relevant assistance offerings for users of the data management system by performing a machine learning process with the training set data. The method includes replacing, in the machine learning process, each zero value for the selection score in the training set data with a respective negative selection score that is a negative number based on a formula that is a function of a number of exposures to a corresponding assistance topic and a coefficient. The method includes determining, in the machine learning process, a satisfactory value for the coefficient and receiving current user profile data related to a current user of the data management system and generating assistance offering recommendation data identifying one or more assistance offerings likely to be relevant to the current user by processing the current user profile data with the recommendation model.

In one embodiment, a computing system implemented method identifies relevant assistance offerings for users of a data management system based on a machine learning process. The method includes generating training set data including, for each of a plurality of historical users of a data management system, profile data indicating characteristics of the historical users of a data management system and historical selection data including, for each of a plurality of assistance offerings previously offered by the data management system to the historical users, a respective selection score for each historical user based on whether the historical user selected the assistance offering. The method includes training an assistance offering recommendation model to identify relevant assistance offerings for users of the data management system by performing a multivariate random forest regression machine learning process with the training set data. The method includes replacing, in the machine learning process, each zero value for the selection score in the training set data with a respective negative selection score that is a negative number based on a formula that is a function of a number of exposures to a corresponding assistance topic and a coefficient and determining, in the multivariate random forest regression machine learning process, a satisfactory value for the coefficient.

In one embodiment, a system for identifying relevant assistance offerings for users of a data management system based on a machine learning process includes at least one processor and at least one memory coupled to the at least one processor. The at least one memory has stored therein instructions which, when executed by any set of the one or more processors, perform a process. The process includes retrieving historical user data including historical profile data related to characteristics of a plurality of historical users of a data management system and retrieving historical selection data including, for each of a plurality of assistance offerings previously offered by the data management system to the historical users, a respective selection score for each historical user based on a number of times that the historical user selected the assistance offering. The process includes generating training set data from the historical user data and the historical selection data and training an assistance offering recommendation model to identify relevant assistance offerings for users of the data management system by performing a machine learning process with the training set data. The process includes replacing, in the machine learning process, each zero value for the selection score in the training set data with a respective negative selection score that is a negative number based on a formula that is a function of a number of exposures to a corresponding assistance topic and a coefficient and determining, in the machine learning process, a satisfactory value for the coefficient. The process includes receiving current user profile data related to a current user of the data management system and generating assistance offering recommendation data identifying one or more assistance offerings likely to be relevant to the current user by processing the current user profile data with the recommendation model.

In one embodiment, a system for identifying relevant assistance offerings for users of a data management system based on a machine learning process includes at least one processor and at least one memory coupled to the at least one processor. The at least one memory has stored therein instructions which, when executed by any set of the one or more processors, perform a process. The process includes generating training set data including, for each of a plurality of historical users of a data management system, profile data indicating characteristics of the historical users of a data management system and historical selection data including, for each of a plurality of assistance offerings previously offered by the data management system to the historical users, a respective selection score for each historical user based on whether the historical user selected the assistance offering and training an assistance offering recommendation model to identify relevant assistance offerings for users of the data management system by performing a multivariate random forest regression machine learning process with the training set data. The process includes replacing, in the machine learning process, each zero value for the selection score in the training set data with a respective negative selection score that is a negative number based on a formula that is a function of a number of exposures to a corresponding assistance topic and a coefficient and determining, in the multivariate random forest regression machine learning process, a satisfactory value for the coefficient.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

As discussed in more detail above, using the above embodiments, with little or no modification and/or input, there is considerable flexibility, adaptability, and opportunity for customization to meet the specific needs of various parties under numerous circumstances.

In the discussion above, certain aspects of one embodiment include process steps and/or operations and/or instructions described herein for illustrative purposes in a particular order and/or grouping. However, the particular order and/or grouping shown and discussed herein are illustrative only and not limiting. Those of skill in the art will recognize that other orders and/or grouping of the process steps and/or operations and/or instructions are possible and, in some embodiments, one or more of the process steps and/or operations and/or instructions discussed above can be combined and/or deleted. In addition, portions of one or more of the process steps and/or operations and/or instructions can be re-grouped as portions of one or more other of the process steps and/or operations and/or instructions discussed herein. Consequently, the particular order and/or grouping of the process steps and/or operations and/or instructions discussed herein do not limit the scope of the invention as claimed below.

The present invention has been described in particular detail with respect to specific possible embodiments. Those of skill in the art will appreciate that the invention may be practiced in other embodiments. For example, the nomenclature used for components, capitalization of component designations and terms, the attributes, data structures, or any other programming or structural aspect is not significant, mandatory, or limiting, and the mechanisms that implement the invention or its features can have various different names, formats, or protocols. Further, the system or functionality of the invention may be implemented via various combinations of software and hardware, as described, or entirely in hardware elements. Also, particular divisions of functionality between the various components described herein are merely exemplary, and not mandatory or significant. Consequently, functions performed by a single component may, in other embodiments, be performed by multiple components, and functions performed by multiple components may, in other embodiments, be performed by a single component.

Some portions of the above description present the features of the present invention in terms of algorithms and symbolic representations of operations, or algorithm-like representations, of operations on information/data. These algorithmic or algorithm-like descriptions and representations are the means used by those of skill in the art to most effectively and efficiently convey the substance of their work to others of skill in the art. These operations, while described functionally or logically, are understood to be implemented by computer programs or computing systems. Furthermore, it has also proven convenient at times to refer to these arrangements of operations as steps or modules or by functional names, without loss of generality.

Unless specifically stated otherwise, as would be apparent from the above discussion, it is appreciated that throughout the above description, discussions utilizing terms such as, but not limited to, "activating", "accessing", "adding", "aggregating", "alerting", "applying", "analyzing", "associating", "calculating", "capturing", "categorizing", "classifying", "comparing", "creating", "defining", "detecting", "determining", "distributing", "eliminating", "encrypting", "extracting", "filtering", "forwarding", "generating", "identifying", "implementing", "informing", "monitoring", "obtaining", "posting", "processing", "providing", "receiving", "requesting", "saving", "sending", "storing", "substituting", "transferring", "transforming", "transmitting", "using", etc., refer to the action and process of a computing system or similar electronic device that manipulates and operates on data represented as physical (electronic) quantities within the computing system memories, resisters, caches or other information storage, transmission or display devices.

The present invention also relates to an apparatus or system for performing the operations described herein. This apparatus or system may be specifically constructed for the required purposes, or the apparatus or system can comprise a general-purpose system selectively activated or configured/reconfigured by a computer program stored on a computer program product as discussed herein that can be accessed by a computing system or other device.

Those of skill in the art will readily recognize that the algorithms and operations presented herein are not inherently related to any particular computing system, computer architecture, computer or industry standard, or any other specific apparatus. Various general-purpose systems may also be used with programs in accordance with the teaching herein, or it may prove more convenient/efficient to construct more specialized apparatuses to perform the required operations described herein. The required structure for a variety of these systems will be apparent to those of skill in the art, along with equivalent variations. In addition, the present invention is not described with reference to any particular programming language and it is appreciated that a variety of programming languages may be used to implement the teachings of the present invention as described herein, and any references to a specific language or languages are provided for illustrative purposes only and for enablement of the contemplated best mode of the invention at the time of filing.

The present invention is well suited to a wide variety of computer network systems operating over numerous topologies. Within this field, the configuration and management of large networks comprise storage devices and computers that are communicatively coupled to similar or dissimilar computers and storage devices over a private network, a LAN, a WAN, a private network, or a public network, such as the Internet.

It should also be noted that the language used in the specification has been principally selected for readability, clarity and instructional purposes, and may not have been selected to delineate or circumscribe the inventive subject matter. Accordingly, the disclosure of the present invention is intended to be illustrative, but not limiting, of the scope of the invention, which is set forth in the claims below.

In addition, the operations shown in the FIG.s, or as discussed herein, are identified using a particular nomenclature for ease of description and understanding, but other nomenclature is often used in the art to identify equivalent operations.

Therefore, numerous variations, whether explicitly provided for by the specification or implied by the specification or not, may be implemented by one of skill in the art in view of this disclosure.

What is claimed is:

1. A method performed by one or more processors of a system, the method comprising:
    retrieving historical user data including historical profile data associated with historical users of a data management system;
    retrieving historical selection data including a selection score for each historical user based on a number of times that the historical users selected an assistance offering;
    generating training set data based on the historical user data and the historical selection data;
    training a recommendation model using the training data set, the trained recommendation model configured to identify assistance offerings for users of the data management system based on replacing each selection score having a predetermined value in the training set data with a negative selection score based on historical user selections for a corresponding assistance offering, wherein the negative selection score comprises a negative number based on a function of a number of exposures to a corresponding assistance topic and a coefficient;
    receiving user profile data related to a user of the data management system;
    generating one or more assistance offerings for the user by processing the user profile data using the trained recommendation model; and
    presenting the assistance offerings on a display screen viewable by the user.

2. The method of claim 1, wherein the assistance offerings are presented to the user in a web page associated with the data management system.

3. The method of claim 1, wherein the assistance offerings are presented to the user in a software application associated with the data management system.

4. The method of claim 1, wherein the data management system includes a tax return preparation system, a bookkeeping system, a personal financial management system, or any combination thereof.

5. The method of claim 1, wherein the historical profile data includes, for each historical user, a length of time that the historical user has been associated with the data management system, a number of employees in a business associated with the historical user, a length of time that a business associated with the historical user has existed, payroll data associated with the historical user, demographic data associated with the historical user, financial data associated with the historical user, clickstream data indicating how the historical user has navigated through data management services provided by the data management system, or any combination thereof.

6. The method of claim 5, wherein the user profile data includes, for the user a length of time that the user has been associated with the data management system, a number of employees in a business associated with the user, a length of time that a business associated with the user has existed, payroll data associated with the user, demographic data associated with the user, financial data associated with the user, clickstream data indicating how the user has navigated through data management services provided by the data management system, or any combination thereof.

7. The method of claim 1, wherein the recommendation model comprises a multivariate random forest regression machine learning process.

8. The method of claim 7, wherein the training set data includes, for each historical user, an input vector indicative of the historical profile data.

9. The method of claim 8, wherein the training set data includes an output matrix representing the historical selection data.

10. The method of claim 9, wherein the recommendation model is configured to iteratively generate test matrices based on processing the historical profile data and comparing the test matrices to the output matrix until the recommendation model generates test matrices that match the output matrix within a selected accuracy threshold.

11. The method of claim 1, wherein the selection score includes a selection rate based on a number of times that the historical user selected the assistance offering and the number of times that the historical user was exposed to the assistance offering.

12. The method of claim 1, wherein each negative selection score has a value between 0 and −1 based on the number of times that the historical user was exposed to the assistance offering.

13. The method of claim 1, wherein the recommendation model is configured to generate the one or more assistance offerings based on the coefficient.

14. A method performed by one or more processors of a system, the method comprising:
generating training set data including, for each of a plurality of historical users of a data management system, profile data indicating characteristics of the historical users of a data management system and historical selection data including, for each of a plurality of assistance offerings previously offered by the data management system to the historical users, a selection score for each historical user based on previous selections of the assistance offering;
performing a multivariate random forest regression machine learning process using the training set data to train a recommendation model by replacing each selection score having a predetermined value in the training set data with a negative selection score based on historical user selection of a corresponding assistance offering, wherein the negative selection score comprises a negative number based on a function of a number of exposures to a corresponding assistance topic and a coefficient;
receiving user profile data related to a user of the data management system;
generating one or more assistance offerings for the user by processing the user profile data using the trained recommendation model; and
presenting the assistance offerings on a display screen viewable by the user.

15. The method of claim 14, wherein the assistance offerings include advertisements for products associated with the data management system.

16. The method of claim 14, wherein the assistance offerings include links to self-help services associated with the data management system.

17. The method of claim 14, wherein each selection score corresponds to a clickthrough rate based on a number of times that a historical user selected an assistance offering and a number of times that the historical user was exposed to the assistance offering.

18. The method of claim 14, wherein the multivariate random forest regression machine learning process is configured to evaluate performance of the recommendation model via a normalized discounted cumulative gain metric.

19. A system for identifying assistance offerings for users of a data management system based on a machine learning process, the system comprising:
at least one processor; and
at least one memory storing instructions that, when executed by the at least one processor, cause the system to:
retrieve historical user data including historical profile data associated with historical users of a data management system;
retrieve historical selection data including a selection score for each historical user based on a number of times that the historical users selected an assistance offering;
generate braining set data from the historical user data and the historical selection data;
train a recommendation model using the training data set, the trained recommendation model configured to identify assistance offerings for users of the data management system based on replacing each selection sore having a predetermined value in the training set data with a negative selection score based on historical user selections for a corresponding assistance offering, wherein the negative selection score comprises a negative number based on a function of a number of exposures to a corresponding assistance topic and a coefficient;
receive user profile data related to a user of the data management system; and
generate one or more assistance offerings for the user by processing the user profile data with the trained recommendation model; and
present the assistance offerings on a display screen viewable by the user.

20. The system of claim 19, wherein execution of the instructions causes the system to present the assistance offerings to the user in a web page associated with the data management system.

21. The system of claim 19, wherein execution of the instructions causes the system to present the assistance offerings to the user in a software application associated with the data management system.

22. The system of claim 19, wherein the data management system includes a tax return preparation system, a bookkeeping system, a personal financial management system, or any combination thereof.

23. The system of claim 19, wherein the historical profile data includes, for each historical user, a length of time that the historical user has been associated with the data management system, a number of employees in a business associated with the historical user, a length of time that a business associated with the historical user has existed, payroll data associated with the historical user, demographic data associated with the historical user, financial data associated with the historical user, clickstream data indicating how the historical user has navigated through data management services provided by the data management system, or any combination thereof.

24. The system of claim 23, wherein the user profile data includes a length of time that the user has been associated with the data management system, a number of employees in a business associated with the user, a length of time that a business associated with the user has existed, payroll data associated with the user, demographic data associated with the user, financial data associated with the user, clickstream data indicating how the user has navigated through data management services provided by the data management system, or any combination thereof.

25. The system of claim 19, wherein the recommendation model comprises a multivariate random forest regression machine learning process.

26. The system of claim 25, wherein the training set data includes, for each historical user, an input vector indicative of the historical profile data.

27. The system of claim 26, wherein the training set data includes an output matrix representing the historical selection data.

28. The system of claim 27, wherein the recommendation model is configured to iteratively generate test matrices based on processing the historical profile date and comparing the test matrices to the output matrix until the recommendation model generates test matrices that match the output matrix within a selected accuracy threshold.

29. The system of claim 19, wherein the selection score includes a selection rate based on a number of times that the historical user selected the assistance offering and the number of times that the user was exposed to the assistance offering.

30. The system of 19, wherein each negative selection score has a value between 0 and −1 based on the number of times that the historical user was exposed to the assistance offering.

31. The system of claim 19, wherein the recommendation model is configured to generate the assistance offering recommendation data based on the coefficient.

32. The system of claim 19, wherein the training set data includes assistance offering characteristics data identifying characteristics of the one or more assistance offerings.

33. The system of claim 32, wherein the assistance offering characteristics data includes, for each assistance offering, a category of the assistance offering, a title of the assistance offering, a format of the assistance offering, or any combination thereof.

34. The system of claim 32, wherein execution of the instructions causes the system to further:
 train the recommendation model based on the assistance offering characteristics data;
 receive new assistance offering data corresponding to a new assistance offering for which the historical selection data is absent or inadequate, the new assistance offering data identifying characteristics of the new assistance offering;
 identify whether the new assistance offering is relevant to the user based on relevance of assistance offerings that are similar to the new assistance offering; and
 present, with the assistance offerings, a recommendation that the new assistance offering is relevant to the user if the new assistance offering is similar to an assistance offering that is relevant to the user.

35. A system for identifying assistance offerings for users of a data management system based on a machine learning process, the system comprising:
 at least one processor; and
 at least one memory configured to store instructions that, when executed by the at least one processor, cause the system to:
  generate training set data including, for each of a plurality of historical users of a data management system, profile data indicating characteristics of the historical users of a data management system and historical selection data including, for each of a plurality of assistance offerings previously offered by the data management system to the historical users, a selection score for each historical user based on previous selections of the assistance offering;
  train a recommendation model using the training set data by performing a multivariate random forest regression machine learning process based on replacing each selection score having a predetermined value in the training set data with a negative selection score based on historical user selections of a corresponding assistance offering, wherein the negative selection score comprises a negative number based on a function of a number of exposures to a corresponding assistance topic and a coefficient;
  receive user profile data related to a user of the data management system;
  generate one or more assistance offerings for the user by processing the user profile data using the trained recommendation model; and
  present the assistance offerings on a display screen viewable by the user.

36. The system of claim 35, wherein the assistance offerings include advertisements for products associated with the data management system.

37. The system of claim 35, wherein the assistance offerings include links to self-help services associated with the data management system.

38. The system of claim 35, wherein each selection score is based on a number of times that a historical user selected an assistance offering and a number of times that the historical user was exposed to the assistance offering.

39. The system of claim 35, wherein the multivariate random forest regression machine learning process is configured to utilize a normalized discounted cumulative gain metric to evaluate performance of the recommendation model.

40. The method of claim 1, wherein the predetermined value is zero.

41. The method of claim 14, wherein the predetermined value is zero.

42. The method of claim 14, wherein each negative selection score has a value between 0 and −1 based on the number of times that the historical user was exposed to the assistance offering.

43. The method of claim 19, wherein the predetermined value is zero.

44. The method of claim 35, wherein the predetermined value is zero.

* * * * *